US011928402B2

(12) United States Patent
Sandahl et al.

(10) Patent No.: US 11,928,402 B2
(45) Date of Patent: Mar. 12, 2024

(54) SIMULATION METHOD RELATED WITH POST-COLLISION OPENING FORCE OF FRONT VEHICLE DOOR

(71) Applicant: Shanghai Volvo Car Research and Development Co., Ltd., Shanghai (CN)

(72) Inventors: Anders Sandahl, Gothenburg (SE); Tao Ni, Shanghai (CN)

(73) Assignee: Shanghai Volvo Car Research and Development Co., Ltd., Shanghai (CN)

( * ) Notice: Subject to any disclaimer, the term of this patent is extended or adjusted under 35 U.S.C. 154(b) by 553 days.

(21) Appl. No.: 17/026,505

(22) Filed: Sep. 21, 2020

(65) Prior Publication Data

US 2021/0089692 A1    Mar. 25, 2021

(30) Foreign Application Priority Data

Sep. 24, 2019 (CN) .......................... 201910903288.6

(51) Int. Cl.
*G06F 30/20* (2020.01)
*G06F 30/15* (2020.01)
(Continued)

(52) U.S. Cl.
CPC .............. *G06F 30/20* (2020.01); *G06F 30/15* (2020.01); *G06F 30/23* (2020.01); *G06F 2119/14* (2020.01)

(58) Field of Classification Search
CPC .......... G06F 30/20; G06F 30/15; G06F 30/23; G06F 2119/14; G06F 30/25; G06F 30/27; G06F 30/28; G06F 30/367; G06F 30/398; G06F 2110/00–2119/22; G01M 7/08; G01M 17/0078
See application file for complete search history.

(56) References Cited

U.S. PATENT DOCUMENTS

2015/0352929 A1    12/2015    Brar

FOREIGN PATENT DOCUMENTS

EP    3537316 A1    9/2019

OTHER PUBLICATIONS

Gandikota, I. "Multilevel Design Optimization of Automotive Structures Using Dummy- and Vehicle-Based Responses" Mississippi State University, Theses and Dissertations. 3228 [retrieved on Jan. 12, 2023] (Year: 2013).*

(Continued)

*Primary Examiner* — Rehana Perveen
*Assistant Examiner* — Alfred H B Wechselberger
(74) *Attorney, Agent, or Firm* — Clements Bernard Walker; Christopher L. Bernard

(57) ABSTRACT

A simulation method related with the opening force of a front vehicle door after a vehicle frontal collision including: a first simulation step in which deformations of vehicle components which are caused in the vehicle frontal collision to affect the opening of the front door are calculated by simulation; and a second simulation step in which the opening force of the front door after the vehicle frontal collision is predicted by simulation; wherein the components which affect the opening of the front door include a design component and an interface component, the deformations of the design component and the interface component obtained in the first simulation step being used as initial geometric conditions of the design component and the interface component in the second simulation step.

20 Claims, 5 Drawing Sheets

(51) Int. Cl.
  *G06F 119/14*   (2020.01)
  *G06F 30/23*    (2020.01)

(56) References Cited

OTHER PUBLICATIONS

Miles et al. "Practical tools for vehicle impact simulation Part 2: an integrated approach using Oasys DYNA3D" Proc Instn Mech Engrs, vol. 205 [retrieved on Jan. 14, 2023] (Year: 1991).*
Lee et al. "Analysis of Twisting Deformation and Structural Design of the Door Frame of a Microwave Oven to Decrease Leakage of Microwave" Journal of the Korean Society of Precision Engineering, vol. 22, No. 12 [retrieved on Jan. 12, 2023] (Year: 2005).*
Donders et al. "CAE Technologies for Efficient Vibro-Acoustic Vehicle Design Modification and Optimization" Proceedings of ISMA 2008 [retrieved on Jan. 14, 2023] (Year: 2008).*
Katkar et al. "Bumper Design Enhancement through Crash Analysis" International Journal of Engineering Technology, Management and Applied Sciences, vol. 3, Special Issue [retrieved on Jan. 14, 2023] (Year: 2015).*
Patil et al. "Door Sag Evaluation of Clothes Dryer by using FEA and Influence of it on Effectiveness of Door" International Research Journal of Engineering and Technology (IRJET), vol. 4, Iss. 7 [retrieved on Jan. 12, 2023] (Year: 2017).*
Lee et al. "Evaluation of Twisting Deformation of the Door Frame of a Microwave Oven by Transient Response Analysis" Transactions of the Korean Society of Mechanical Engineers A, vol. 29 Iss. 9 Ser. No. 240, pp. 1282-1288; pISSN: 1226-4873 [ retrieved on Jan. 12, 2023] (Year: 2005).*
Mozzone, M. "Study of the Door Closing Performance of an Aluminum Door" [Thesis] 4922, University of Windsor [retrieved on Jan. 12, 2023] (Year: 2013).*
Liu et al. "Structure Optimization of Rear Door Based on Side Impact of a Specific Vehicle" 2011 Second International Conference on Mechanic Automation and Control Engineering; doi: 10.1109/MACE.2011.5988175 [retrieved on Jul. 10, 2022] (Year: 2011).*
Jan. 1, 25, 2021 European Search Report issued on International Application No. 20198140.

* cited by examiner

SIMULATION METHOD RELATED WITH POST-COLLISION OPENING FORCE OF FRONT VEHICLE DOOR

CROSS-REFERENCE TO RELATED APPLICATION

This application claims priority to CN Patent Application No. 201910903288.6, filed on Sep. 24, 2019, which is incorporated herein by reference in its entirety.

TECHNICAL FIELD

The disclosure relates to a simulation method related with the opening force of a front door of a vehicle after the vehicle has undergone a frontal collision.

BACKGROUND

After a frontal collision of a vehicle, persons in the vehicle should generally come out from the vehicle immediately. However, front fenders of some types of vehicles are likely deformed in a frontal collision so interference occurs between the fenders and front doors of the vehicles, which results in difficulties in opening the front doors and thus blocks the escaping of in-vehicle persons. Considering this problem, the post-collision opening force of a front vehicle door, as an important parameter used in the evaluating of the vehicle safety, is generally measured in a frontal collision test. Engineers now generally measure the post-collision opening force of a front vehicle door in a physical test after a front collision and then make necessary adjustments to the structures of vehicle components if the opening force does not meet a safety requirement. However, traditional post-collision opening force tests are time and cost consuming, can only provide feedback to the structure design in a later stage (often after a vehicle to be tested is completely formed), and cannot only provide information on some target components.

SUMMARY

The disclosure is aimed at providing a simulation method related with the post-collision opening force of a front vehicle door to substitute the traditional physical test, the method being able to at least predicting the post-collision opening force of the front vehicle door by simulation.

According to one aspect of the disclosure, a simulation method related with the post-collision opening force is provided, the method including: a first simulation step in which deformations of vehicle components, which are caused in the vehicle frontal collision to affect the opening of the front door are calculated by simulation; and a second simulation step in which the opening force of the front door after the vehicle frontal collision is predicted by simulation; wherein the components which affect the opening of the front door include a design component and an interface component, the design component being a component that will be modified for changing the opening force of the front door after the vehicle frontal collision, the interface component being a component that will not be modified for changing the opening force of the front door, and the deformations of the design component and the interface component obtained in the first simulation step being used as initial geometric conditions of the design component and the interface component in the second simulation step.

In one embodiment, the method is carried out after a vehicle frontal collision simulation, the deformation of the interface component obtained in the vehicle frontal collision simulation being fixed and used as a boundary condition for calculating the deformation of the design component in the first simulation step.

In one embodiment, the design component includes at least one of a fender mount and an NHV insulation plate which are mounted between a back portion of a front fender and a front hinge pillar of the vehicle body.

In one embodiment, the NHV insulation plate is the design component to be modified, the modification to the NHV insulation plate including forming a thinned wall or perforation in one or more portions of the NHV insulation plate.

In one embodiment, the design component further includes mounting flaps, including back mounting flaps of the front fender.

In one embodiment, the interface component includes at least one of: the front fender, the front door, front door hinges, and the front hinge pillar to which the back portion of the front fender and the front door hinges are attached.

In one embodiment, in the second simulation step, an imaginary spring is used to pull a handle bar of the front door handle bar to open the front door.

In one embodiment, the second simulation step is first conducted in which the opening of the front door is simulated under different opening speeds to obtain door opening force curves each reflecting a relation between the door opening force and the door opening time or angle, and based on the obtained door opening force curves, a door opening speed is selected from the opening speeds and will be used when the second simulation step is conducted next time.

In one embodiment, the method further includes verifying the validity of the door opening speeds by conducting physical tests, wherein a door opening speed is determined as an effective door opening speed if the difference between the simulated door opening force under this speed and the tested door opening force falls with an error limit for each door opening time or door opening angle, and the maximum door opening speed of all of the effective door opening speeds is selected to be used when the second simulation step is conducted next time.

In one embodiment, the method further includes conducting the first and second simulation steps repetitively with the design component being modified each time until the opening force of the front door after the vehicle frontal collision meets a safety requirement, and the final design of the design component is then determined.

According to the disclosure, post-collision opening forces can be reliably predicted in an early stage of the real development procedure of a type of vehicle. In some embodiments, vehicle structures for measuring the opening forces can be modified effectively.

DETAILED DESCRIPTION OF EMBODIMENTS

Now embodiments of a simulation method related with the post-collision opening force of a front door of a vehicle will be described with reference to the drawings.

Figure 1:
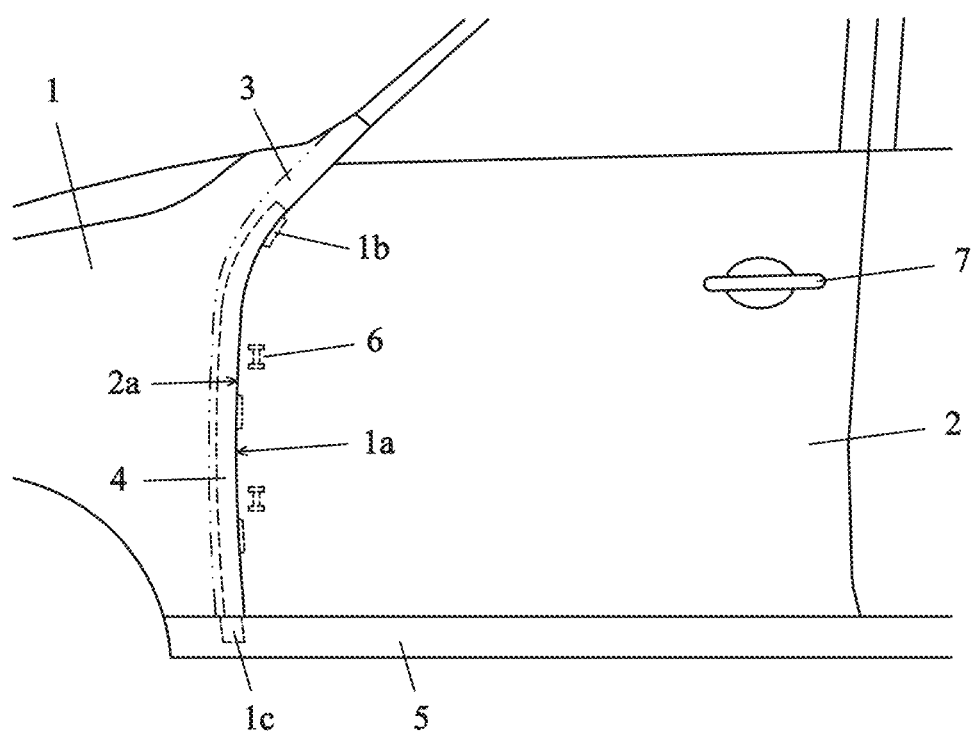
FIG. 1 is a schematic partial view of a front fender of a vehicle and structures neighboring it.

FIG. 1 schematically shows a front part of a vehicle, wherein a back edge 1a of a front fender 1 of the vehicle is adjacent to a front edge 2a of a front door 2. The back portion of the fender 1 includes several (three in FIG. 1) back mounting flaps 1b which are fixed to a fender mount 3 by screws, and the fender mount 3 is mounted to a front hinge pillar (not shown) of the vehicle body (not shown). For increasing sound insulation, an NHV insulation plate 4 is arranged between the fender mount 3 and the vehicle body. The NHV insulation plate 4 is generally formed of an elastic material, like rubber. The lower portion of the fender 1 includes a mounting flap 1c which is fixed to a floor beam 5 of the vehicle body. Further, other portions of the fender 1 include mounting flaps (not shown) that are fixed to corresponding portions of the vehicle body.

A front portion of the front door 2 is attached to the front hinge pillar by door hinges 6. A handle bar 7 is provided on a back portion of the front door 2.

Figure 2:
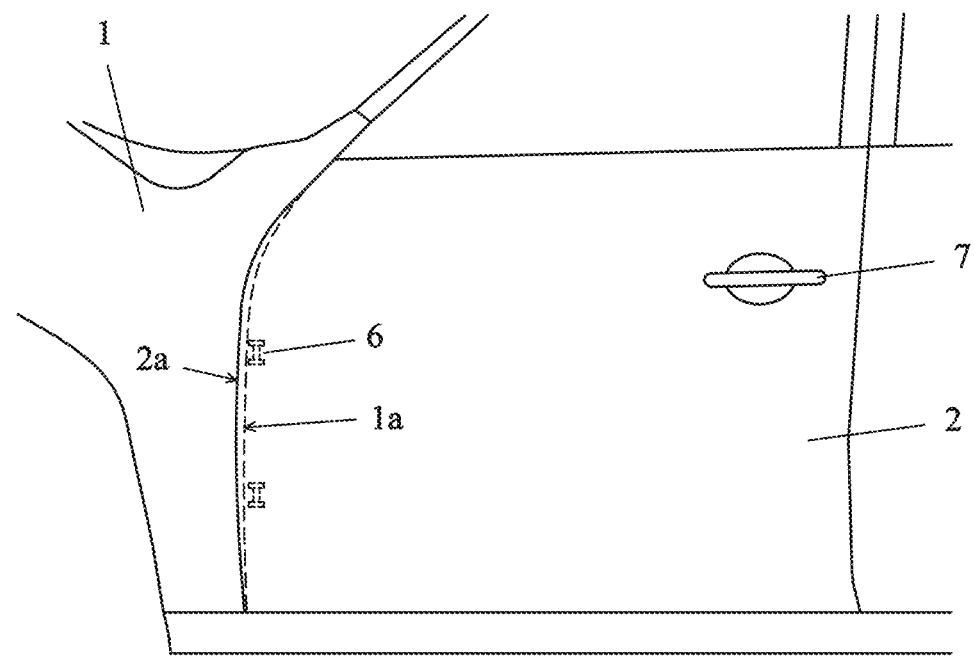
FIG. 2 is a schematic partial view of the front fender which is deformed after the vehicle has undergone a frontal collision.

FIG. 2 schematically shows the front part of a vehicle after a frontal collision, wherein the fender 1 is deformed and its main portion becomes bent upwardly. The back edge 1a of the fender 1 is displayed backwards and becomes confliction with the front edge 2a of the front door 2. Specifically, the back edge 1a, together with the fender mount 3 and the insulation plate 4, is compressed between the front edge 2a of the front door 2 and the hinge 6. In this condition, when a person opens the front door 2, the front edge 2a of the front door 2 will abut against the back edge 1a of the fender 1 so that the force for opening the front door 2 becomes larger. If the opening force is too large, a person, especially the driver, who sits on the front driving seat, may be unable to open the front door 2 or unable to open the front door 2 to a certain angle that allows the person to escape from the vehicle.

The disclosure provides a simulation method to predict the opening force (post-collision opening force) of the front door 2 after the vehicle has undergone a frontal collision. If it finds that the front door 2 cannot be opened, or cannot be opened to a predetermined angle, the structures of one or more of the vehicle components which affect the opening of the front door 2 will be modified.

In the simulation method of the disclosure, the vehicle components which affect the opening of the front door 2 are categorized into two types, i.e., design components and interface components. Here "design components" include the components that can be modified to ensure that the front door 2 can be opened after the vehicle has undergone a frontal collision. The modification to the design components mainly changes the opening force of the front door 2, but has little effect on the vehicle deformation in the frontal collision. For example, the design components may include the fender mount 3, the insulation plate 4, and the flaps of the fender 1, especially the back mounting flaps 1b and the lower flaps 1c, in particular the back mounting flaps 1b, including the structures and locations of the flaps. The interface components are components round the design components. Other functions of the vehicle will be affected if the interface components are modified, so according to the disclosure, it does not need to modify the interface components for reducing the opening force of the front door 2 after the vehicle has undergone a frontal collision. The interface components include the fender 1, the front door 2, the door hinge 6, and a side frame of the vehicle body (including the front hinge pillar, the floor beam 5, and some frame parts that are not shown in the figure, like the A pillar and the top beam).

The simulation method according to one aspect of the disclosure is carried out after a vehicle frontal collision simulation process. In an embodiment of the disclosure, the simulation method includes two simulation steps. The first simulation step includes deformation simulation, in which deformations of the components that affect the opening of the front door 2 after the vehicle frontal collision are obtained in a quick simulation process. It should be noted that it does not need to perform any further vehicle frontal collision in the first simulation step; rather, the first simulation step includes a quick and partial simulation process in which only deformation of the interface components and the design components are involved, wherein deformations of the interface components are obtained directly from the existed results (as recorded in a data base) of the vehicle frontal collision imitation and are used as boundary conditions in the calculation of the deformations of the design components. In the second simulation step, based on the deformations of the components that affect the opening of the front door 2 as obtained in the first simulation step, the opening force is calculated by simulation, in which an imaginary spring applied to the front door handle bar 7 is used to pull open the front door 2 at predetermined speeds. The deformations of the design components and the interface components obtained in the first simulation step will be used as initial geometric conditions of the design components and the interface components in the second simulation step.

Based on the simulation results obtained in the second simulation step, structures of the design components can be modified. Then, the modified design components are introduced into the two simulation steps to simulate the deformations of the design components and the opening force again. By repetitively performing the modifications and the two simulation steps in this way (iteration), an opening force meeting the safety requirement can be obtained.

It should be noted that the design components discussed in the disclosure are selected in the following manner: the modifications to the design components only affect the opening force of the front door 2, but do not affect other functions of the vehicle. Thus, the selected design components are generally components that are of less importance to the main functions of the vehicle, such as the insulation plate 4, the fender mount 3 and the flaps of the fender 1 as mentioned above. Modifications to the design components have little effect to the deformations of the interface components in the frontal collision, so the changes in the deformations of the interface components are not taken into consideration. That is to say, in the first simulation step of the disclosure, the deformations of the interface components are fixed, i.e., equal to the deformations of the interface components obtained in the vehicle frontal collision simulation process (assuming there is no modification to the interface components), and the deformations of the interface components are used as boundary conditions in the calculating of the deformations of the design components. In this way, in each simulation iteration for modifying the structures of the design components, only the deformations of the design components (a small number of components in all the components that affect the opening of the front door 2) are simulated in the first simulation step to obtain the updated deformation states of the design components. For calculating the updated deformations of the design components, it does not need to conduct a further vehicle frontal collision simulation which generally consumes a long calculating time. Thus, simulation time is reduced greatly.

In the simulation method according to one aspect of the disclosure, known finite element simulation software, like LS-Dyna, may be used. LS-Dyna is generally used in engineering simulation for solving two or three dimensional non-linear problems and can provide precise and efficient modeling. Results of some simulations according to one aspect of the disclosure based on LS-Dyna will be described below. However, the simulation method of the disclosure can also use other finite element simulation software.

Figure 3:
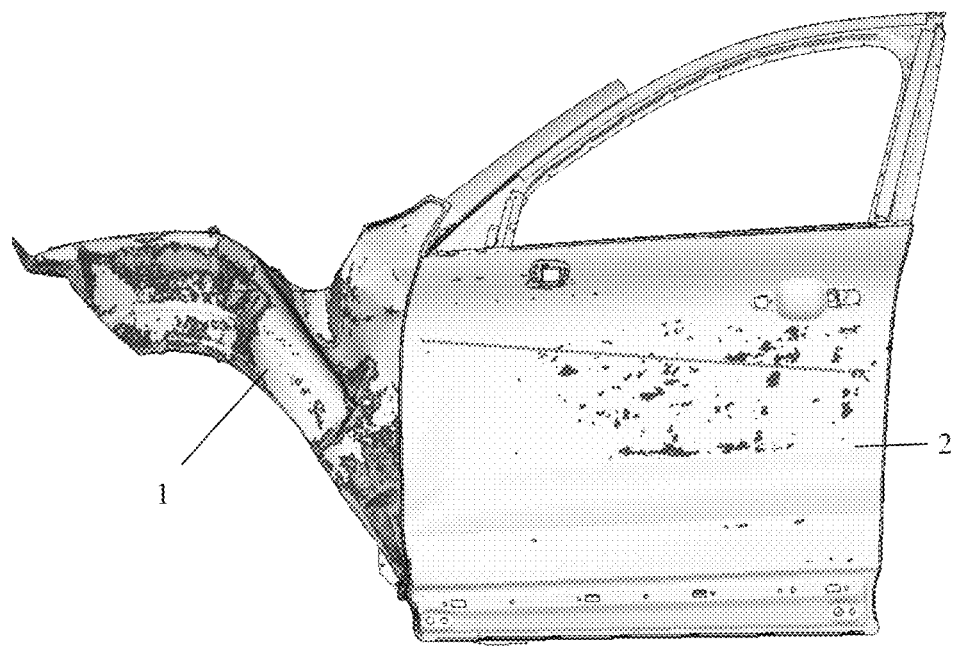
FIG. 3 is a picture showing the deformations of the fender and a front door after a vehicle frontal collision of the vehicle, the deformations being obtained in a simulation according to one aspect of the disclosure.

Deformation simulations to the design components using the first simulation step are conducted and further described below. As an example, FIG. 3 shows exemplary simulation results of the first simulation step, wherein simulated deformation of the front fender 1 after a frontal collision of vehicle can be seen. Dark areas on the fender 1 and the front door 2 represent stress concentration areas. The front and middle portions of the fender 1 bent upwardly significantly, and the back portion of the fender 1 has less deformation. Deformations of other components which affect the opening of the front door 2 are also calculated, although not indicated in the figure. The front door 2 has no obvious deformation. As mentioned above, the back edge of the fender 1 may be moved backwards to a location between the front edge of the front door 2 and the door hinge. Thus, when the front door 2 is being opened, the front edge of the front door 2 may be obstructed by the back edge of the fender 1 so that it is difficult to open the front door 2. In addition, even if the front door 2 can be opened, the force for opening the front door 2 may become larger as the opening angle of the front door 2 become larger for the reason that the back edge of the fender 1 is compressed and deformed by the front edge of the front door 2 (and the fender mount 3 and the insulation plate 4 may also compressed and deformed).

Then, the opening force of the front door 2 under the deformations obtained in the first simulation step will be calculated in the second simulation step of the disclosure. The deformations of the design components and the interface components calculated in the first simulation step will be used as initial geometric conditions of the design components and the interface components in the second simulation step.

Figure 4:
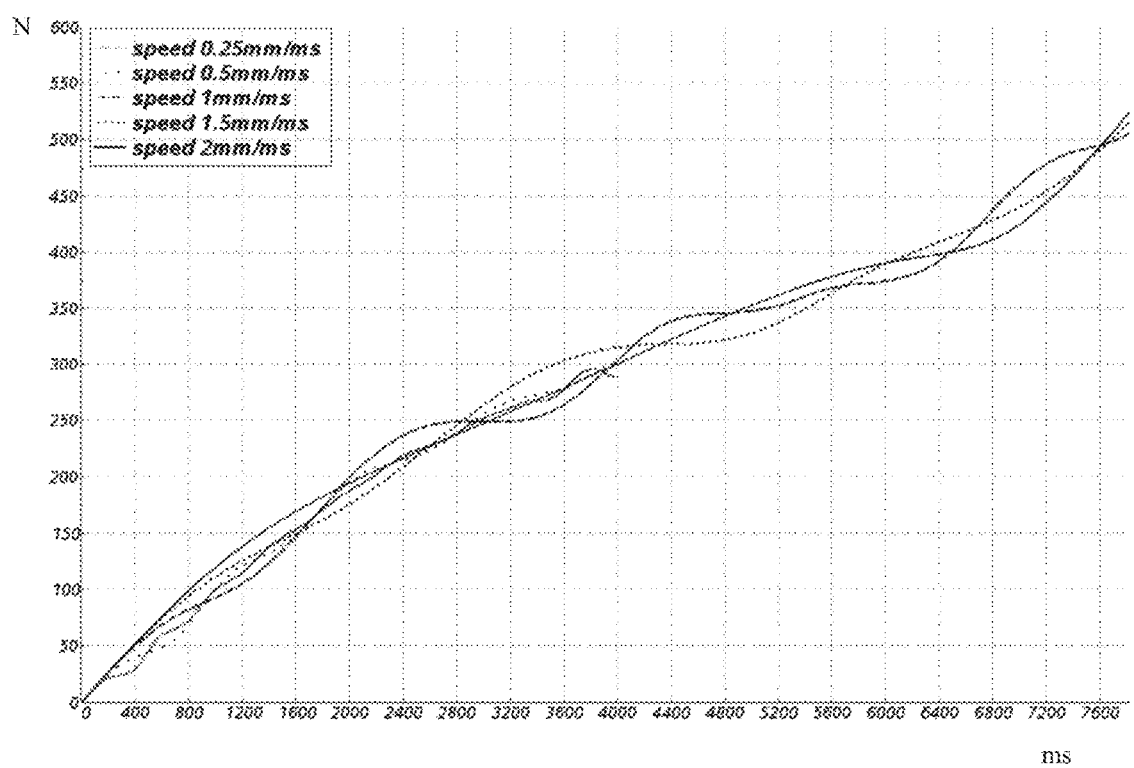
FIG. 4 is a diagram of opening force curves obtained at different door opening speeds obtained in the simulation according to one aspect of the disclosure.

First, the inventors conducted the second simulation step once in which the front door is opened at different constant speeds 0.25, 0.5, 1, 1.5, 2 (mm/ms) as measured at the front door handle bar, and the relations between opening speeds and the opening forces are analyzed. The simulation results are shown in FIG. 4, in which the horizontal axis represents time (ms) after the initial opening of the front door and the vertical axis represents the opening force (N). It can be seen from the simulation results that the opening forces under different door opening speeds change with time in a similar manner in the illustrated time range. Based on this understanding, the highest door opening speed (for example, a constant speed of 2 mm/ms) is used to conduct the second simulation step next time to save simulation time.

Figure 5:
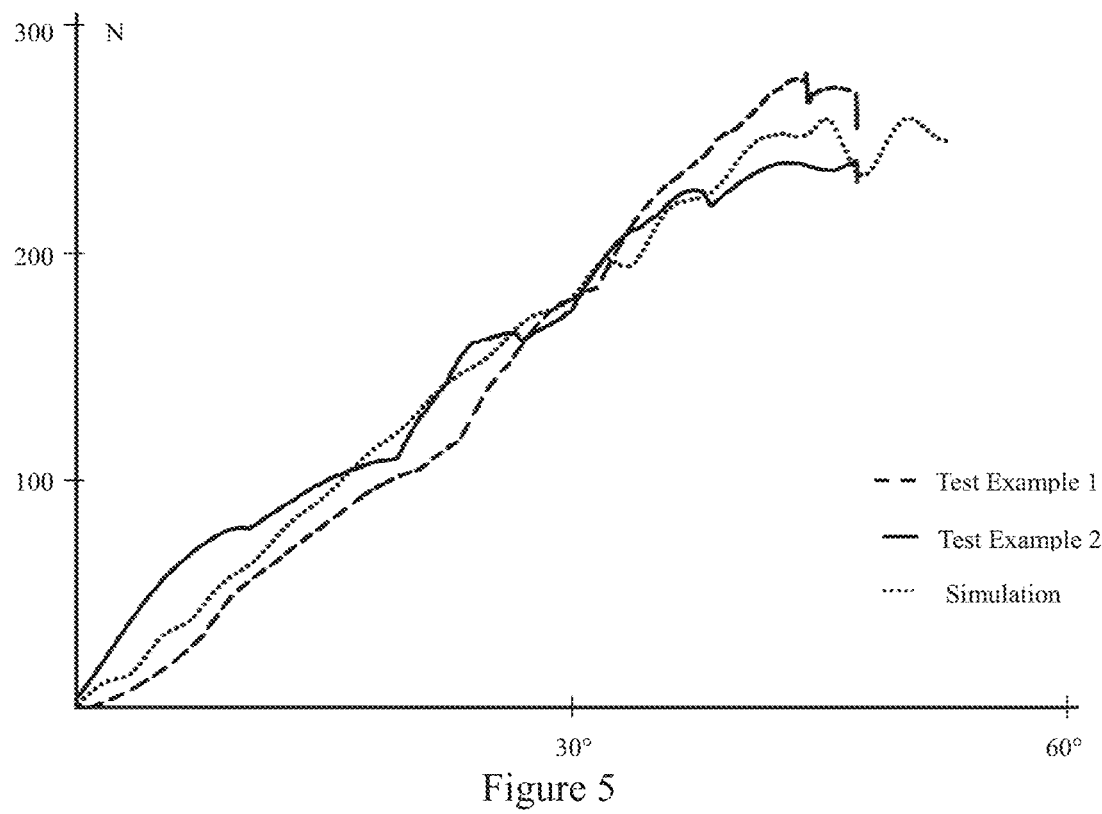
FIG. 5 is a diagram showing an opening force curve obtained in the simulation according to one aspect of comparing with opening force curves obtained in physical tests at the same door opening speed in a condition that there is no modification to the structures of vehicle components.

Then, the accuracy of the second simulation step is verified by conducting both the second simulation step and physical tests (test example 1 and test example 2 conducted under the same conditions as the simulation) at the same door opening speed. The verification result is shown in FIG. 5, in which the horizontal axis represents the opening angle of the front door (degrees) and the vertical axis represents the opening force (N). It can be seen that the simulated opening force curve extends in a path similar to that of the physical tests, and the values of simulated opening force are close to that of the physical tests. The maximum simulated opening force, which is presented when the front door is opened to 45 degrees, has an error less than 5% compared with that obtained in the physical tests.

Then, the simulation and test conditions are verified and the second simulation step and physical tests are conducted under the same conditions again, and then the results of second simulation step with that of the physical tests are compred to further verify the accuracy of the simulation method of the disclosure.

Figure 6:
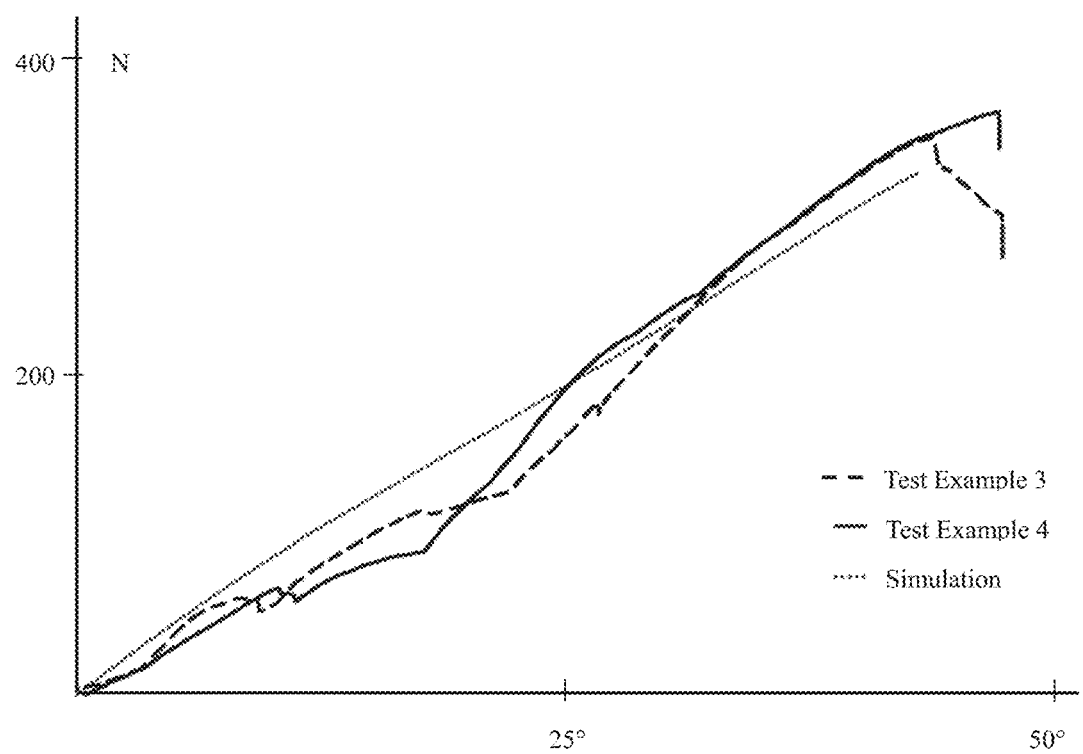
FIGS. 6-8 are diagrams showing opening force curve obtained in the simulation according to one aspect of comparing with opening force curves obtained in physical tests under various conditions.

FIG. 6 shows the results of the second simulation step according to one aspect of the disclosure and two physical test examples (test example 3 and test example 4 conducted under the same conditions with simulation) with the vehicle being equipped with an NHV insulation plate at the driver seat side. In FIG. 6, the horizontal axis represents the opening angle of the front door (degrees) and the vertical axis represents the opening force (N). By comparison of the results of the simulation and that of the physical tests, it can be seen that the opening force obtained by the second simulation step according to one aspect of the disclosure is very similar to that of the physical tests in both the value and the curve path, so the simulation method of the disclosure is verified as having high accuracy.

Figure 7:
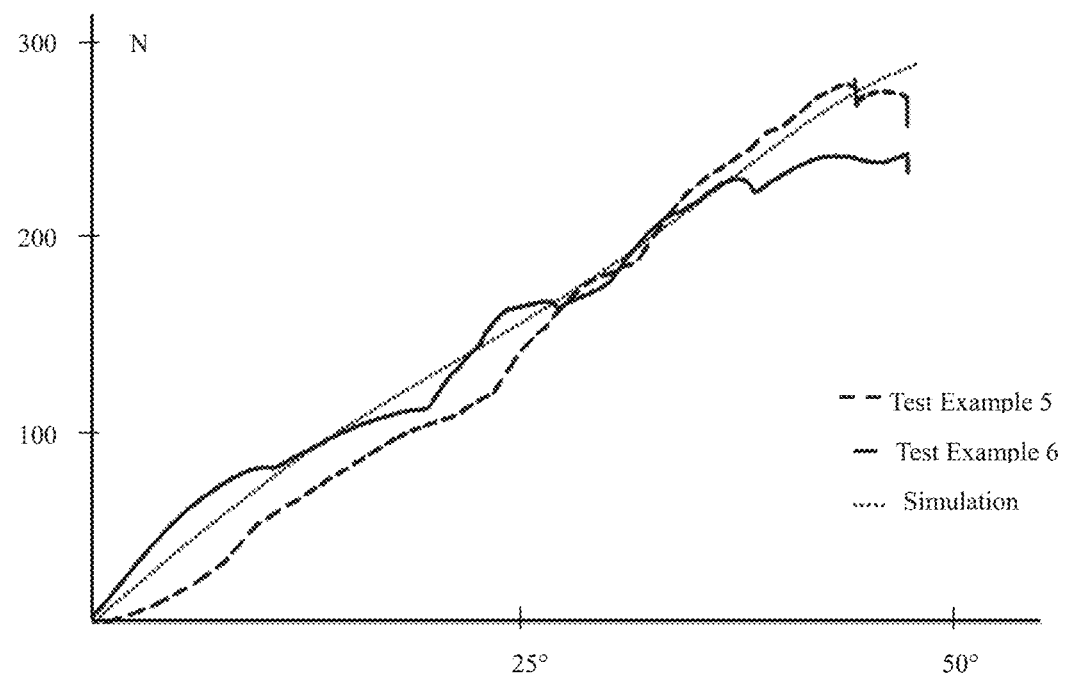

FIG. 7 shows the results of the second simulation step according to one aspect of the disclosure and two physical test examples (test example 5 and test example 6 conducted under the same conditions with simulation) with the vehicle being not equipped with an NHV insulation plate at the driver seat side. In FIG. 7, the horizontal axis represents the opening angle of the front door (degrees) and the vertical axis represents the opening force (N). By comparison the results of the simulation and that of the physical tests, it can be seen that the opening force obtained by the second simulation step of the disclosure is very similar to that of the physical tests in both the value and the curve path, so the simulation method of the disclosure is further verified as having high accuracy.

Further, by comparison of the results of FIG. 6 and FIG. 7, it can be found that, when there is provided with an NHV insulation plate, the opening force of the front door is larger than the opening force of the front door when there is no NHV insulation plate. The maximum opening force of the front door when there is an NHV insulation plate is larger than the maximum opening force of the front door when there is no NHV insulation plate by about 100 N. This comparison indicates that the NHV insulation plate presents an obstacle to the opening of the front door after the vehicle frontal collision.

Figure 8:
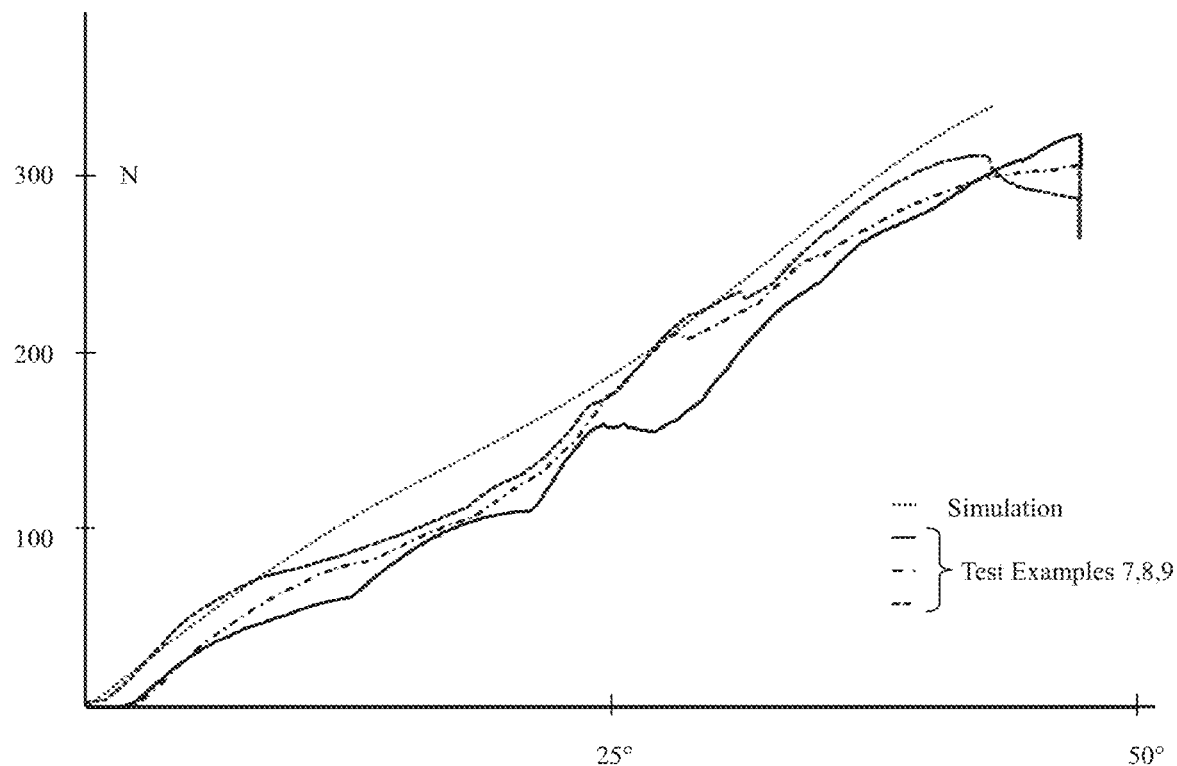

Based on this finding, it is determined that, in order that the opening force of the front door is reduced to meet the safety requirement after a vehicle frontal collision, the structure of the NHV insulation plate may be modified. Then, some modifications are made to the current NHV insulation plate and, based on the modified NHV insulation plate, an updated opening force of the front door from the second simulation step as well as updated opening forces from physical tests is obtained. Results of simulation and physical tests (test examples 7, 8, 9) are shown in FIG. 8. By comparing the data of FIG. 8 with that of FIG. 7, it can be seen that, by modifying the structure of the NHV insulation plate, the post-collision opening force of the front door can be reduced. For example, the average maximum opening force is reduced by about 46N. As a conclusion, the post-collision opening force of the front door can be reduced by modifying the structure of the NHV insulation plate.

Figure 9:
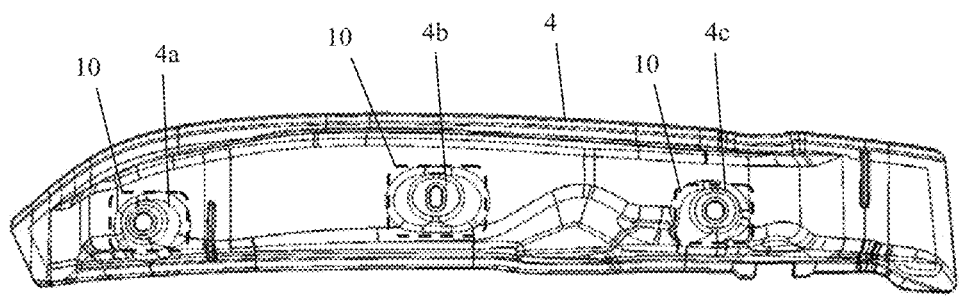
FIGS. 9-11 are schematic views of an NHV insulation plate, which is mounted near the back portion of the front fender, with different modifications in the design of insulation plate.
Figure 10:
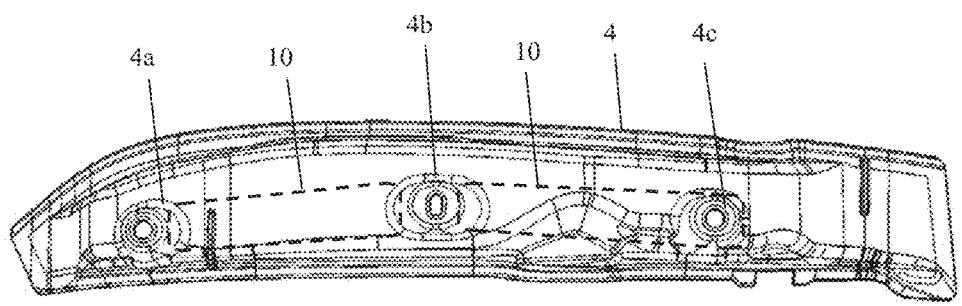
Figure 11:
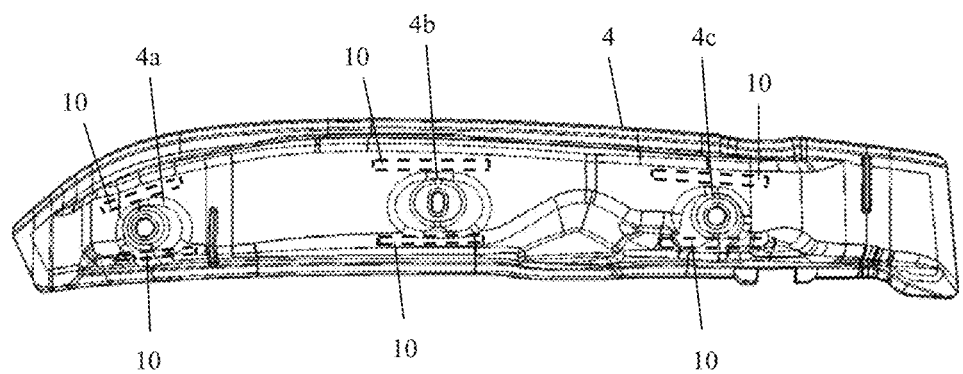

Some exemplary modifications to the NHV insulation plate that can reduce the post-collision opening force of the front door are shown in FIGS. 9 to 11.

As shown in FIG. 9, the NHV insulation plate 4 is formed with protrusions 4*a*, 4*b* and 4*c* for respectively covering screw nuts or screw heads of screw bolts used for fixing the fender back mounting flaps to the fender mount. Each protrusion 4*a*, 4*b* or 4*c* is formed with a portion that has a reduced thickness with respect to remaining portions of the NHV insulation plate 4 so that three thinner portions 10 as indicated by dashed lines are formed in the NHV insulation plate 4.

As shown in FIG. 10, portions of the NHV insulation plate 4 between the protrusions 4*a*, 4*b* and 4*c* each have a reduced thickness with respect to remaining portions of the NHV insulation plate 4 so that two thinner portions 10 as indicated by dashed lines are formed in the NHV insulation plate 4.

As shown in FIG. 11, portions of the NHV insulation plate 4 between the protrusions 4*a*, 4*b* and 4*c* and the adjacent lateral edges of the NHV insulation plate 4 each have a reduced thickness with respect to remaining portions of the NHV insulation plate 4 so that six thinner portions 10 as indicated by dashed lines are formed.

It is appreciated that the post-collision opening force of the front door can be reduced to meet a safety requirement by forming a thin wall in other portions of the NHV insulation plate. By repeating the second simulation step several times, preferred thinned portions of the NHV insulation plate and their thicknesses can be determined.

It is further appreciated that other types of treatments can be made to the NHV insulation plate so that the post-collision opening force of the front door is reduced to meet the safety requirement. For example, perforation can be formed in one or more portions of the NHV insulation plate.

Further, it is appreciated that the flaps of the front fender, especially the back mounting flaps of the front fender, or other design components can be modified so that the post-collision opening force of the front door is reduced to meet the safety requirement.

Modifications to each of the design components can be determined by repetitively conducting the design iteration and the first and second simulation steps as described in the disclosure. Thus, according to a further embodiment, the simulation method of the disclosure includes conducting the first and second simulation steps repetitively with modified design components.

In summary, according to one aspect of the disclosure, deformations of the interface components that are calculated in a vehicle frontal collision simulation are fixed and used as boundary conditions in the first simulation step for calculating deformations of the design components. It does not need to conduct the vehicle frontal collision simulation in each design iteration, which results in a significant reduction in the total simulation time.

Further, based on opening force curves obtained under different door opening speeds, an allowable maximum door opening speed to be used in the further conducting of the second simulation step can be determined. The opening force curve under the allowable maximum door opening speed must have a path similar to that of the opening force curves obtained under other door opening speeds. By using the allowable maximum door opening speed in the second simulation step, simulation time can be further reduced while simulation precision can be ensured.

Further, in prior art, the opening force of the front door is physically measured after a vehicle frontal collision test, or be tested in a destructive test conducted in a durability test laboratory. On the contrary, according to the simulation method described in the disclosure, the post-collision opening force of the front door is precisely predicted by simulation, and modifications to the design components for reducing the opening force can be verified in a quick process.

While certain embodiments have been described, these embodiments have been presented by way of example only, and are not intended to limit the scope of the disclosure. The attached claims and their equivalents are intended to cover all the modifications, substitutions and changes as would fall within the scope and spirit of the disclosure.

The invention claimed is:

1. A method for simulating opening force of a front door of a vehicle after a vehicle frontal collision, the method comprising:

performing a first simulation step simulating deformations of vehicle components that are caused in the vehicle frontal collision and affect opening of the front door using instructions stored in a memory and executed by a processor; and performing a second simulation step determining the opening force of the front door after the vehicle frontal collision using the deformations of the vehicle components of the first simulation step and a predetermined door opening speed using instructions stored in the memory and executed by the processor;

wherein the vehicle components that affect the opening of the front door comprise a design component and an interface component, wherein the design component is a component that is modified for changing the opening force of the front door after the vehicle frontal collision but does not affect the vehicle deformation in the vehicle frontal collision and does not affect functions of the vehicle other than the opening force of the front door, and wherein the interface component is a component that is not modified for changing the opening force of the front door after the vehicle frontal collision because modification of the interface component affects functions of the vehicle other than the opening force of the front door; and wherein deformations of the design component and the interface component obtained in the first simulation step are used as initial geometric conditions of the design component and the interface component in the second simulation step;

conducting a physical front door opening force test using the deformations of the vehicle components of the first simulation step and the predetermined door opening speed;

comparing the determined opening force of the front door of the second simulation step with a result of the physical front door opening force test; and based on the comparison. again performing the second simulation step determining the opening force of the front door after the vehicle frontal collision using the deformations of the vehicle components of the first simulation step and a modified predetermined door opening speed using instructions stored in the memory and executed by the processor.

2. The simulation method of claim 1, wherein the design component comprises at least one of a fender mount and an NHV insulation plate which are mounted between a back portion of a front fender and a front hinge pillar of the vehicle body.

3. The simulation method of claim 2, wherein the NHV insulation plate is the design component to be modified, the modification to the NHV insulation plate comprising forming a thinned wall or perforation in one or more portions of the NHV insulation plate.

4. The simulation method of claim 2, wherein the design component further comprises mounting flaps, including back mounting flaps of the front fender.

5. The simulation method of claim 1, wherein the interface component comprises at least one of: the front fender, the front door, front door hinges, and the front hinge pillar to which the back portion of the front fender and the front door hinges are attached.

6. The simulation method of claim 1, wherein in the second simulation step, an imaginary spring is used to pull a handle bar of the front door handle bar to open the front door.

7. The simulation method of claim 1, wherein the second simulation step is first conducted in which the opening of the front door is simulated under different opening speeds to obtain door opening force curves each reflecting a relation between the door opening force and the door opening time or angle, and based on the obtained door opening force curves, a door opening speed is selected from the opening speeds and will be used when the second simulation step is conducted next time.

8. The simulation method of claim 7, further comprising verifying the validity of the door opening speeds by conducting physical tests, wherein a door opening speed is determined as an effective door opening speed if the difference between the simulated door opening force under this speed and the tested door opening force falls with an error limit for each door opening time or door opening angle, and the maximum door opening speed of all of the effective door opening speeds is selected to be used when the second simulation step is conducted next time.

9. The simulation method of claim 1, further comprising conducting the first and second simulation steps repetitively with the design component being modified each time until the opening force of the front door after the vehicle frontal collision meets a safety requirement, and the final design of the design component is then determined.

10. A non-transitory computer-readable medium comprising instructions stored in a memory and executed by a processor carry out a method for simulating opening force of a front door of a vehicle after a vehicle frontal collision, the method comprising:

performing a first simulation step simulating deformations of vehicle components that are caused in the vehicle frontal collision and affect opening of the front door using instructions stored in a memory and executed by a processor; and performing a second simulation step determining the opening force of the front door after the vehicle frontal collision using the deformations of the vehicle components of the first simulation step and a predetermined door opening speed using instructions stored in the memory and executed by the processor;

wherein the vehicle components that affect the opening of the front door comprise a design component and an interface component, wherein the design component is a component that is modified for changing the opening force of the front door after the vehicle frontal collision but does not affect the vehicle deformation in the vehicle frontal collision and does not affect functions of the vehicle other than the opening force of the front door, and wherein the interface component is a component that is not modified for changing the opening force of the front door after the vehicle frontal collision because modification of the interface component affects functions of the vehicle other than the opening force of the front door; and wherein deformations of the design component and the interface component obtained in the first simulation step are used as initial geometric conditions of the design component and the interface component in the second simulation step;

conducting a physical front door opening force test using the deformations of the vehicle components of the first simulation step and the predetermined door opening speed;

comparing the determined opening force of the front door of the second simulation step with a result of the physical front door opening force test; and based on the comparison, again performing the second simulation step determining the opening force of the front door after the vehicle frontal collision using the deformations of the vehicle components of the first simulation step and a modified predetermined door opening speed using instructions stored in the memory and executed by the processor.

11. The non-transitory computer-readable medium of claim 10, wherein the design component comprises at least one of a fender mount and an NHV insulation plate which are mounted between a back portion of a front fender and a front hinge pillar of the vehicle body.

12. The non-transitory computer-readable medium of claim 11, wherein the NHV insulation plate is the design component to be modified, the modification to the NHV insulation plate comprising forming a thinned wall or perforation in one or more portions of the NHV insulation plate.

13. The non-transitory computer-readable medium of claim 11, wherein the design component further comprises mounting flaps, including back mounting flaps of the front fender.

14. The non-transitory computer-readable medium of claim 10, wherein the interface component comprises at least one of: the front fender, the front door, front door hinges, and the front hinge pillar to which the back portion of the front fender and the front door hinges are attached.

15. The non-transitory computer-readable medium of claim 10, wherein in the second simulation step, an imaginary spring is used to pull a handle bar of the front door handle bar to open the front door.

16. The non-transitory computer-readable medium of claim 10, wherein the second simulation step is first conducted in which the opening of the front door is simulated under different opening speeds to obtain door opening force curves each reflecting a relation between the door opening force and the door opening time or angle, and based on the obtained door opening force curves, a door opening speed is selected from the opening speeds and will be used when the second simulation step is conducted next time.

17. The non-transitory computer-readable medium of claim 16, further comprising verifying the validity of the door opening speeds by conducting physical tests, wherein a door opening speed is determined as an effective door opening speed if the difference between the simulated door opening force under this speed and the tested door opening force falls with an error limit for each door opening time or door opening angle, and the maximum door opening speed of all of the effective door opening speeds is selected to be used when the second simulation step is conducted next time.

18. The non-transitory computer-readable medium of claim 10, further comprising conducting the first and second simulation steps repetitively with the design component being modified each time until the opening force of the front door after the vehicle frontal collision meets a safety requirement, and the final design of the design component is then determined.

19. The simulation method of claim 1, wherein the design component is an NHV insulation plate and the method further comprises, based on the determined opening force of the front door of the second simulation step, forming the NHV insulation plate with reduced thickness portions for reducing the opening force of the front door.

20. The non-transitory computer-readable medium of claim 10, wherein the design component is an NHV insulation plate and the method further comprises, based on the determined opening force of the front door of the second simulation step, forming the NHV insulation plate with reduced thickness portions for reducing the opening force of the front door.

* * * * *